United States Patent
Deavours et al.

(10) Patent No.: US 7,557,757 B2
(45) Date of Patent: Jul. 7, 2009

(54) INDUCTIVELY COUPLED FEED STRUCTURE AND MATCHING CIRCUIT FOR RFID DEVICE

(75) Inventors: Daniel D. Deavours, Lawrence, KS (US); Madhuri Bharadwaj Eunni, Overland Park, KS (US)

(73) Assignee: The University of Kansas, Lawrence, KS (US)

( * ) Notice: Subject to any disclaimer, the term of this patent is extended or adjusted under 35 U.S.C. 154(b) by 274 days.

(21) Appl. No.: 11/610,288

(22) Filed: Dec. 13, 2006

(65) Prior Publication Data
US 2007/0194993 A1   Aug. 23, 2007

Related U.S. Application Data

(60) Provisional application No. 60/750,182, filed on Dec. 14, 2005.

(51) Int. Cl.
*H01Q 1/38* (2006.01)
(52) U.S. Cl. .................. 343/700 MS; 343/860; 340/572.7
(58) Field of Classification Search ............. 340/572.7; 343/700 MS, 850, 860
See application file for complete search history.

(56) References Cited

U.S. PATENT DOCUMENTS

| | | | |
|---|---|---|---|
| 5,300,936 A | 4/1994 | Izadian | |
| 5,406,298 A | 4/1995 | Walters | |
| 6,215,402 B1 | 4/2001 | Kodukula | |
| 6,320,509 B1 | 11/2001 | Brady | |
| 6,329,915 B1 | 12/2001 | Brady | |
| 6,441,740 B1 * | 8/2002 | Brady et al. | 340/572.7 |
| 6,806,831 B2 | 10/2004 | Johansson | |
| 6,839,028 B2 | 1/2005 | Lee | |
| 6,929,412 B1 | 8/2005 | Barrus | |
| 6,963,317 B2 | 11/2005 | Zuk | |
| 6,975,834 B1 | 12/2005 | Forster | |
| 7,298,273 B2 * | 11/2007 | Baba | 340/572.7 |
| 7,394,382 B2 * | 7/2008 | Nitzan et al. | 340/572.8 |
| 7,400,298 B2 * | 7/2008 | Fogg et al. | 343/700 MS |
| 7,443,347 B2 * | 10/2008 | Mei | 343/700 MS |

(Continued)

OTHER PUBLICATIONS

Constatine A. Balanis, "Linear Wire Antennas", Antenna Theory: Analysis Design, Third Edition, 2005, pp. 151-214; John Wiley & Sons, Inc.

(Continued)

*Primary Examiner*—Tan Ho
(74) *Attorney, Agent, or Firm*—Spencer Fane Britt & Browne LLP

(57) ABSTRACT

A feed structure (18) and matching circuit (20) for inductively coupling an antenna (16) with an IC (22) in an RFID tag (10). The tag (10) includes first and second feed structures (26,28) coupled with the antenna (16), a first transmission line (30) coupling the feed structures (26,28), and a matching circuit (20) including a second transmission line (32) having a portion that is substantially parallel to and spaced apart from the first transmission line (30) such that the first and second transmission lines (30,32) inductively couple. Where two or more antenna elements (56,57) are used, the elements (56,57) are sufficiently loosely coupled by inductive coupling that they can operate at nearly the same frequency without forming a single resonant antenna. Thus, for example, different elements can operate at approximately 905 MHz and approximately 925 MHz, respectively, to effectively cover the FCC range of 900-930 MHz.

15 Claims, 2 Drawing Sheets

U.S. PATENT DOCUMENTS

| | | | |
|---|---|---|---|
| 2001/0048361 A1 | 12/2001 | Mays | |
| 2003/0058180 A1 | 3/2003 | Forester | |
| 2005/0024287 A1 | 2/2005 | Jo | |
| 2005/0088354 A1 | 4/2005 | Chang | |
| 2005/0243005 A1 | 11/2005 | Raf | |
| 2006/0208900 A1* | 9/2006 | Tavassoli Hozouri | 340/572.7 |
| 2007/0200711 A1* | 8/2007 | Kai et al. | 340/572.7 |

OTHER PUBLICATIONS

"ECCOPAD Application Note", Emerson & Cuming Microwave Products, Feb. 15, 2006.

Daniel D. Deavours, A Performance Analysis of Commercially Available UHF RFID Tags Based on EPCglobal's Class 0 and Class 1 Specifications,: Report 1, RFID Alliance Lab, Lawrence, KS, Dec. 2004.

Daniel D. Deavours, "UHF EPC Tag Performance Evaluation," Report 2, RFID Alliance Lab, Lawrence, KS, May 2005.

"ECCOPAD Isolators for Read on Metal RFID" Emerson & Cuming Microwave Products, brochure Aug. 2006.

C.A.Diugwu, J.C. Batchelor, R.J. Langley, and M. Fogg, "Planar Antenna for Passive Radio Frequency Identification (RFID) Tags", 7th AFRICON Conference in Africa (AFRICON 2004) (Gaborne, Botswana), vol. 1, pp. 21-24. Sep. 2004.

Leena Ukkonen, Lauri Sydanheimo, Markku Kivikoski, "A Novel Tag Design Using Inverted-F Antenna for Radio Frequency Identification of Metallic Objects," Proc. IEEE Sarnoff Symposium on Advances in Wired and Wireless Communication (Princeton, NJ), pp. 91-94, 2004.

M. Hirvonen, P. Pursula, K. Jaakkola, & K. Laukkanen, Planar Inverted-F Antenna for Radio Frequency Identification:, IEEE Electronics Letters, vol. 40, No. 14, pp. 848-850, Jul. 2004.

Leena Ukkonen, Lauri Sydanheimo, Markku Kivikoski, "Effect of Metallic Plate Size on the Performance of Microstrip Patch-Type Tag Antennas for Passive RFID," IEEE Antenna and Wireless Propagation Letters, vol. 4, pp. 410-413, 2005.

Leena Ukkonen, Marijke Schaffrath, Daniel W. Engels, Lauri Sydanheimo, and Markku Kivikoski, Operability of Folded Microstrip Patch-Type Tag Antenna in the UHF RFID Bands within 865-928 MHz; Apr. 2006.

ECCOPAD UHF 915 MHz Isolator RFID Tags on Metal, Emerson & Cuming Microwave Products, Randolph,, MA, revision Aug. 4, 2005.

ECCOPAD Metaltag, Read on Metal UHF RFID Tag, Emerson & Cuming Microwave Products, Randolph,, MA, revision Aug. 17, 2007.

* cited by examiner

INDUCTIVELY COUPLED FEED STRUCTURE AND MATCHING CIRCUIT FOR RFID DEVICE

RELATED APPLICATIONS

The present non-provisional patent application is related to and claims priority benefit of an earlier-filed provisional patent application titled RADIO FREQUENCY IDENTIFICATION (RFID) ANTENNA TECHNIQUES, Ser. No. 60/750,182, filed Dec. 14, 2005. The identified earlier-filed application is hereby incorporated by reference into the present application.

FIELD OF THE INVENTION

The present invention relates generally to radio frequency identification (RFID) devices, and, more specifically, to feed structures and matching circuits for coupling antennas with integrated circuits in RFID devices, and methods for making same.

BACKGROUND OF THE INVENTION

RFID devices are used in a variety of different applications, including, for example, monitoring, cataloging, and tracking items. An RFID system typically includes a transponder, or "tag", for storing and transmitting data, an interrogator, or "reader", for receiving the data from the tag, and a data communications network for conveying the data received by the interrogator to an information system.

RFID tags generally have a tag antenna and an integrated circuit (IC). Tag antennas can be constructed from a variety of materials, including silver, copper, and aluminum, and can be printed (e.g., silkscreen, gravure, flexography), etched, stamped, or grown. Tags are "active" if they contain an internal power source, and "passive" if they receive power from an external source such as the interrogator. Battery assisted tags (BATs) are a type of passive tag that uses an internal source to power the IC and an external source to power RF transmission.

In a two-terminal IC, one terminal is connected to the tag antenna, and the other terminal is connected to an electrical reference. In a four-terminal IC, one pair of terminals may be connected to a first dipole antenna, and the other pair of terminals may be connected to a second dipole antenna. Typically, the two dipole antennas are planar and orthogonal in space, which provides polarization and directional diversity.

RFID interrogators have an interrogator antenna, and use radio frequency signals to acquire data remotely from tags that are within range. More specifically, the tag communicates with the interrogator by modulating the scattering parameters of the tag antenna. For example, the IC presents an impedance that is the complex conjugate of the antenna impedance; as a result, half of the RF energy will be delivered to the IC, and half scattered or re-radiated into space. However, a dipole antenna in which the two feed points are shorted is effectively a metal wire of resonant length. RF energy of the resonant frequency induces currents in the resonant wire. Since a wire is an excellent conductor, all RF energy is scattered. By modulating its impedance, the IC of the passive tag is able to change the scattering characteristics of the tag. The interrogator detects this change in the magnitude or phase of the backscattered energy and thereby detects signals from the tag.

RFID systems operate over a range of different frequencies including low frequency (LF), typically around 125-135 KHz, high-frequency (HF), typically around 13.56 MHz, ultra-high-frequency (UHF), typically around 433 MHz to 900 MHz, and microwave radio bands, typically around 2.4 to 5.8 GHz. At LH and HF frequencies, the tag antenna is typically coupled to the interrogator antenna by a magnetic component of a reactive near-field, in which both antennas are configured as coils in a resonant circuit. However, typical antennas used in near-field systems are only a small fraction of a wavelength in their linear dimensions and, therefore, are inefficient electromagnetic radiators and receptors. As a result, the useful range of operation may be limited to as little as a few inches from the interrogator antenna. Such a short read distance is a significant disadvantage in many applications.

At UHF and microwave frequencies, the tag antenna is typically coupled to the interrogator antenna by a radiating far-field, which is an electromagnetic (EM) wave that propagates over distances typically of more than a few wavelengths. As a result, the useful range of operation can be up to twenty feet or more. However, compared to the HF band, the radiation and reception of EM waves at these higher frequency bands are affected much more strongly by obstacles and materials in the immediate environment of the antennas. In particular, attaching tags to metal objects or containers containing metal or water is problematic.

Many UHF RFID tags are provided with resonant dipole antennas. Dipole antennas are known to have good free-space characteristics and a convenient form factor and are easy to design and manufacture. However, dipole antennas suffer considerable performance degradation when placed near a high-loss and/or high-dielectric material, such as water, or near a conductor, such as metal. This is commonly referred to as the "metal/water problem" and occurs because the dielectric or conductive material changes the electromagnetic properties of the antenna, which changes the impedance and resonant frequency of the antenna. More specifically, when a dipole antenna is placed near a conductor, the operation of the antenna changes from that of a "free space resonator" to a "volume resonator", which impacts the performance of the antenna in a number of ways. If the antenna is no longer resonant, it becomes less efficient at radiating and receiving RF energy. The bandwidth of the antenna becomes narrower, such that the antenna is only efficient over a much smaller range of frequencies. If the antenna is intended to operate outside of this narrow band, it will suffer degraded performance. Furthermore, as the resonant frequency of the antenna changes, the characteristic impedance of the antenna changes. This further degrades performance by reducing efficient power transfer between the antenna and the IC. Additionally, if the dielectric material is lossy (e.g., water), the dielectric loss further contributes to the degradation of antenna performance. Additionally, if the antenna is very close to metal, the conductive losses of the antenna can become more pronounced, especially when not operating at its resonant frequency. Various solutions to these problems have been proposed, but all suffer from one or more limitations and disadvantages.

Inductive coupling has been employed to couple free-space dipole antennas with ICs in RFID tags. Using inductive coupling advantageously increases the bandwidth of the antenna.

Some RFID tags are provided with microstrip antennas. A microstrip antenna is an antenna comprising a thin metallic conductor bonded to one side of a substrate. A ground plane is bonded to the opposite side of the substrate. Microstrip antennas behave primarily as volume resonators, which is fundamentally different from non-microstrip antennas. Generally, a tag incorporating a microstrip antenna also comprises a feed structure and matching circuit. The antenna, feed structure, and matching circuit are designed specifically to operate with the substrate, and the ground plane electrically isolates the antenna from the material to which it is attached.

Unfortunately, attempts to inductively couple microstrip antennas have generally been unsuccessful due to the nature of wide rectangular antennas.

SUMMARY OF THE INVENTION

The present invention overcomes the above-described and other problems by providing an improved feed structure and matching circuit for inductively coupling a microstrip antenna with an integrated circuit in an RFID tag. In a first embodiment, the RFID tag comprises the microstrip antenna, first and second feed structures coupled with the microstrip antenna, a first transmission line coupling the first feed structure with the second feed structure, and a matching circuit including a second transmission line having a portion that is substantially parallel to and spaced apart from the first transmission line such that the first and second transmission lines inductively couple. In various applications, the first and second transmission lines are spaced apart a distance approximately between 0.1 mm and 1.5 mm.

In a second, multi-element embodiment, the RFID tag comprises a first microstrip antenna, first and second feed structures coupled with the first microstrip antenna, a first transmission line coupling the first feed structure with the second feed structure, a second microstrip antenna, third and fourth feed structures coupled with the second microstrip antenna, a second transmission line coupling the third feed structure with the fourth feed structure, and a matching circuit including a third transmission line having a portion that is substantially parallel to and spaced apart from the first transmission line such that the first and third transmission lines inductively couple, and a fourth transmission line having a portion that is substantially parallel to and spaced apart from the second transmission line such that the second and fourth transmission lines inductively couple. In one embodiment, the first microstrip antenna resonates at a first resonance frequency and the second microstrip resonates at a second resonance frequency. In one embodiment, the first and second resonance frequencies are between approximately 900 MHz and 930 MHZ. In various applications, the parallel transmission lines are spaced apart a distance approximately between 0.1 mm and 1.5 mm.

These and other features of the present invention are described in more detail in the section titled DETAILED DESCRIPTION, below.

BRIEF DESCRIPTION OF THE DRAWINGS

The following drawings form part of the present specification and are included to further demonstrate certain aspects of the present invention. The figures are examples only, and do not limit the scope of the invention.

DETAILED DESCRIPTION

With reference to the figures, an RFID tag is herein described, shown, and otherwise disclosed in accordance with one or more preferred embodiments of the present invention. More specifically, the present invention concerns an improved feed structure and matching circuit for inductively coupling a microstrip antenna with an integrated circuit in an RFID tag.

Figure 1:
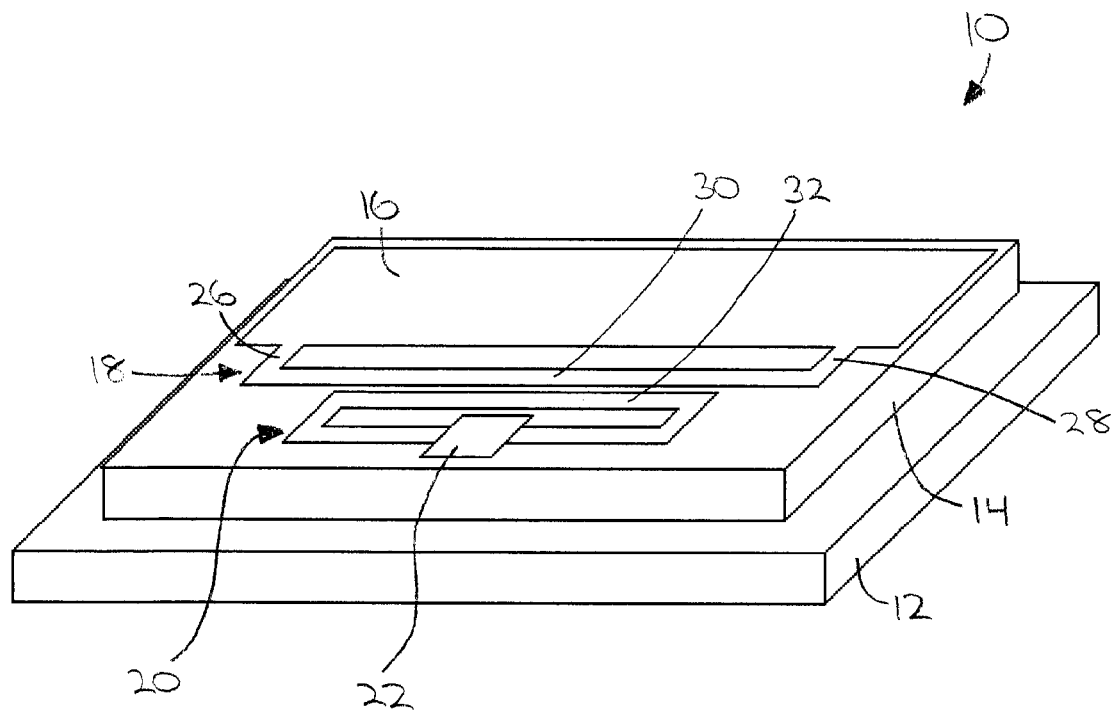
FIG. 1 is an isometric view of an RFID tag in which a feed structure is inductively coupled with a matching circuit.

Referring to FIG. 1, an RFID tag 10, or "transponder", is shown comprising a ground plane 12, a dielectric substrate 14, a microstrip antenna 16, a feed structure 18, an impedance matching circuit 20, and an IC 22. The antenna 16, feed structure 18, and matching circuit 20 are designed to operate with the ground plane 12 and the dielectric substrate 14 to electrically isolate the antenna 16 from the material to which the tag 10 is attached.

As discussed, inductive coupling has been employed to couple free-space dipole antennas with ICs in RFID tags. Using inductive coupling advantageously increases the bandwidth of the antenna. Unfortunately, attempts to similarly inductively couple microstrip antennas have generally been unsuccessful due to the nature of these wide rectangular antennas. These problems are avoided in the present invention by adding a U-shaped transmission line to the rectangular patch which forces higher current densities into the U-shaped transmission line and thereby increases the inductive coupling between the antenna and the matching circuit. This solution advantageously increases the bandwidth of the antenna without requiring an increase in the thickness of the substrate or the form factor of the antenna. The separation distance between the two lines is generally small to induce a high coupling coefficient. In various applications, for example, separation distances of approximately between 0.1 mm and 1.5 mm are sufficient, with stronger coupling resulting from narrower separation.

Referring again to FIG. 1, in one embodiment, the RFID tag 10 comprises the microstrip antenna 16 and first and second feed structures 26,28, or projections, coupled by a first transmission line 30, and the matching circuit 20 including a second transmission line 32 having a portion that is parallel to and spaced apart from, i.e., not physically connected to, the first transmission line 30 such that the first and second transmission lines 30,32 inductively couple.

Figure 2:
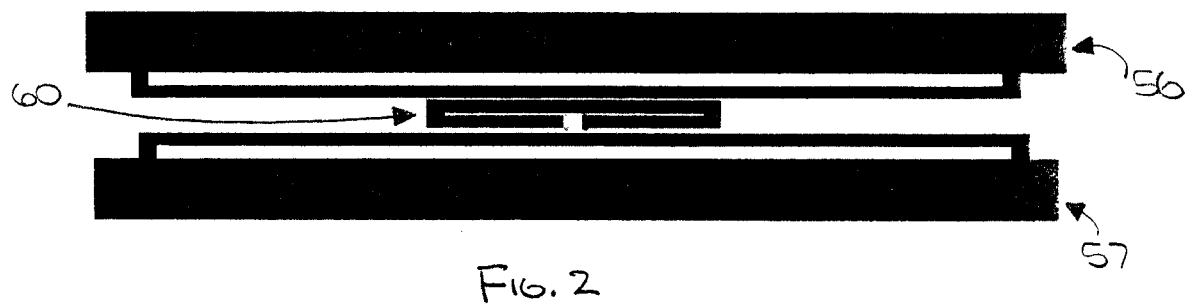
FIG. 2 is a plan view of a multi-element microstrip antenna which resonates at different frequencies, wherein each antenna includes a feed structure which is inductively coupled to a common matching circuit.

Inductive coupling is particularly useful for coupling multiple antennas. For small, thin microstrip antennas, the operating bandwidth may be small, e.g., a 3 dB bandwidth of less than 5 MHz, and so there is a need for antennas which resonate at multiple frequencies. Referring to FIG. 2, in a multi-element 56,57 antenna, the elements 56,57 are inductively coupled with a common matching circuit 60, similar to the design of FIG. 1. The elements 56,57 are loosely coupled by inductive coupling, and thus, can operate at nearly the same frequency without forming a single resonant antenna. In this design, the elements 56,57 may operate at approximately 905 MHz and approximately 925 MHz, respectively, to effectively cover the FCC range of 900-930 MHz.

Figure 3:
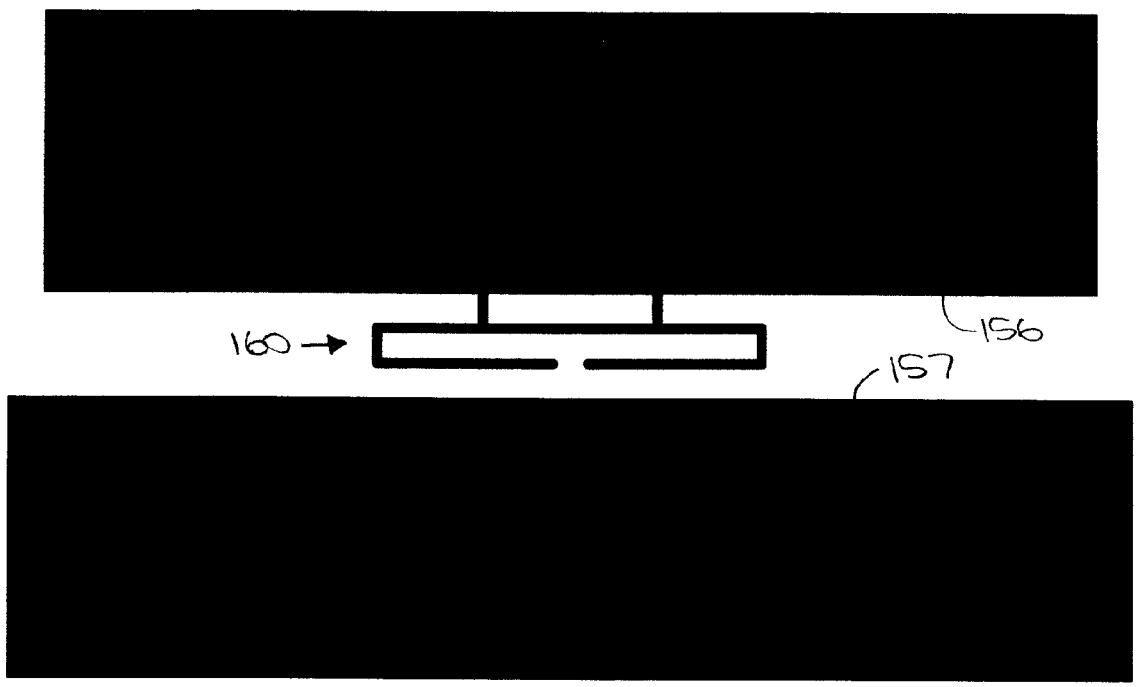
FIG. 3 is a plan view of an alternative embodiment of the multi-element microstrip antenna.

Referring to FIG. 3, an alternative embodiment of the multi-element 156,157 antenna is shown. The first element 156 is directly coupled via the matching circuit 160; the second element 157 is inductively coupled to the loop in the matching circuit 160. In one embodiment, the second element 157 resonates at a different frequency than the first element 156, so that the tag operates effectively at the two frequencies.

Figure 4:
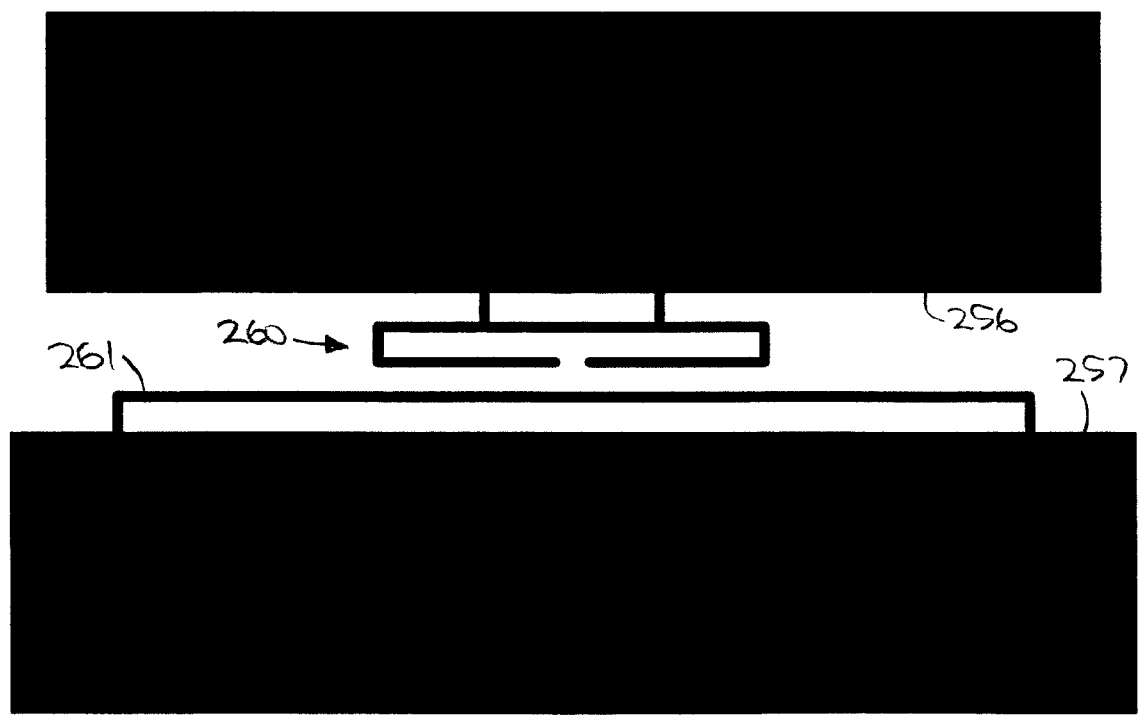
FIG. 4 is a plan view of an alternative embodiment of the multi-element microstrip antenna.

Referring to FIG. 4, an alternative embodiment of the multi-element 256,257 antenna is shown. The first element 256 is directly coupled via the matching circuit 260. A parasitic structure 261 is attached to the second element 257 and extends, at least along a portion of its length, substantially adjacent to and substantially parallel with at least a portion of the matching circuit 260. The second element 257 is inductively coupled to the matching circuit 260 via the structure 261, which results in a stronger inductive coupling than in the embodiment of FIG. 3.

All of the apparatuses and methods disclosed and claimed herein can be made and executed without undue experimentation in light of the present disclosure. While the present invention has been described in terms of particular embodiments, it will be apparent to those of ordinary skill in the art that variations can be applied to the methods and in the steps or in the sequence of steps of the method described herein without departing from the concept, spirit, and scope of the invention. All such similar substitutes and modifications apparent to those skilled in the art are deemed to be within the spirit, scope, and concept of the disclosure as defined by the appended claims.

The invention claimed is:

1. A radio frequency identification transponder comprising:
   a microstrip antenna;
   first and second feed projections coupled with the microstrip antenna;
   a first transmission line coupling the first feed projection with the second feed projection; and
   an impedance matching circuit including a second transmission line having a portion that is substantially parallel to and spaced apart from the first transmission line such that the first and second transmission lines inductively couple.

2. The radio frequency identification transponder as set forth in claim 1, wherein the first and second transmission lines are spaced apart a distance approximately between 0.1 mm and 1.5 mm.

3. The radio frequency identification transponder as set forth in claim 1, wherein the first and second feed structures and the first transmission line form a U-shaped structure.

4. A radio frequency identification transponder comprising:
   a first microstrip antenna;
   first and second feed projections coupled with the first microstrip antenna;
   a first transmission line coupling the first feed projection with the second feed projection;
   a second microstrip antenna;
   third and fourth feed projections coupled with the second microstrip antenna;
   a second transmission line coupling the third feed projection with the fourth feed projection; and
   an impedance matching circuit including:
      a third transmission line having a portion that is substantially parallel to and spaced apart from the first transmission line such that the first and third transmission lines inductively couple, and
      a fourth transmission line having a portion that is substantially parallel to and spaced apart from the second transmission line such that the second and fourth transmission lines inductively couple.

5. The radio frequency identification transponder as set forth in claim 4, wherein the first microstrip antenna resonates at a first resonance frequency and the second microstrip resonates at a second resonance frequency.

6. The radio frequency identification transponder as set forth in claim 5, wherein the first and second resonance frequencies are between approximately 900 MHz and 930 MHZ.

7. The radio frequency identification transponder as set forth in claim 4, wherein the parallel transmission lines are spaced apart a distance approximately between 0.1 mm and 1.5 mm.

8. The radio frequency identification transponder as set forth in claim 4, wherein the first and second feed structures and the first transmission line form a first U-shaped structure, and the third and fourth feed structures and the second transmission line form a second U-shaped feed structure.

9. In a radio frequency identification transponder for physical association with an object and for storing and communicating data about the object, the radio frequency identification transponder having a microstrip antenna and an integrated circuit, the improvement comprising:
   first and second feed projections coupled with the microstrip antenna;
   a first transmission line coupling the first feed projection with the second feed projection;
   an impedance matching circuit including a second transmission line having a portion that is substantially parallel to and spaced apart from the first transmission line such that the first and second transmission lines inductively couple.

10. The radio frequency identification transponder as set forth in claim 9, wherein the first and second transmission lines are spaced apart a distance approximately between 0.1 mm and 1.5 mm.

11. In a radio frequency identification transponder for physical association with an object and for storing and communicating data about the object, the radio frequency identification transponder having an integrated circuit, the improvement comprising:
   a first microstrip antenna;
   first and second feed projections coupled with the first microstrip antenna;
   a first transmission line coupling the first feed projection with the second feed projection;
   a second microstrip antenna;
   third and fourth feed projections coupled with the second microstrip antenna;
   a second transmission line coupling the third feed projection with the fourth feed projection; and
   an impedance matching circuit including:
      a third transmission line having a portion that is substantially parallel to and spaced apart from the first transmission line such that the first and third transmission lines inductively couple, and
      a fourth transmission line having a portion that is substantially parallel to and spaced apart from the second transmission line such that the second and fourth transmission lines inductively couple.

12. The radio frequency identification transponder as set forth in claim 11, wherein the first microstrip antenna resonates at a first resonance frequency and the second microstrip resonates at a second resonance frequency.

13. The radio frequency identification transponder as set forth in claim 12, wherein the first and second resonance frequencies are between approximately 900 MHz and 930 MHZ.

14. The radio frequency identification transponder as set forth in claim 11, wherein the parallel transmission lines are spaced apart a distance approximately between 0.1 mm and 1.5 mm.

15. The radio frequency identification transponder as set forth in claim 11, wherein the first and second feed structures and the first transmission line form a first U-shaped structure, and the third and fourth feed structures and the second transmission line form a second U-shaped feed structure.

* * * * *